US008606420B2

(12) United States Patent
Kalagnanam et al.

(10) Patent No.: US 8,606,420 B2
(45) Date of Patent: Dec. 10, 2013

(54) SOLVING LARGE-SCALE SECURITY-CONSTRAINED ECONOMIC DISPATCH PROBLEM IN REAL-TIME

(75) Inventors: Jayant R. Kalagnanam, Tarrytown, NY (US); Dung Phan, Ossining, NY (US)

(73) Assignee: International Business Machines Corporation, Armonk, NY (US)

(*) Notice: Subject to any disclaimer, the term of this patent is extended or adjusted under 35 U.S.C. 154(b) by 321 days.

(21) Appl. No.: 13/183,865

(22) Filed: Jul. 15, 2011

(65) Prior Publication Data

US 2013/0018517 A1    Jan. 17, 2013

(51) Int. Cl.
*G05D 11/00*    (2006.01)

(52) U.S. Cl.
USPC ............................ 700/291; 703/18; 714/14

(58) Field of Classification Search
USPC ............................ 700/291; 703/18; 714/14
See application file for complete search history.

(56) References Cited

U.S. PATENT DOCUMENTS

| | | | | |
|---|---|---|---|---|
| 5,798,939 | A * | 8/1998 | Ochoa et al. | 700/286 |
| 6,775,597 | B1 * | 8/2004 | Ristanovic et al. | 700/293 |
| 7,203,622 | B2 * | 4/2007 | Pan et al. | 702/184 |
| 7,620,482 | B2 * | 11/2009 | El-Gasseir et al. | 700/286 |
| 7,660,649 | B1 * | 2/2010 | Hope et al. | 700/295 |
| 7,743,001 | B1 * | 6/2010 | Vermeulen et al. | 705/400 |
| 8,090,479 | B2 * | 1/2012 | El-Gasseir et al. | 700/286 |
| 8,191,360 | B2 * | 6/2012 | Fong et al. | 60/408 |
| 2003/0139939 | A1 * | 7/2003 | Spool et al. | 705/1 |
| 2004/0267513 | A1 * | 12/2004 | Westermann et al. | 703/18 |

OTHER PUBLICATIONS

Xing, E. P., "Optimal Margin Principle and Lagrangian Duality", 10-801: Advanced Topics in Graphical Models 10-801, Spring 2007, Carnegie Mellon University.
Jia, Y.-B., "Lagrange Multipliers", Nov. 18, 2008.
Eckstein, J., et al., "An Alternating Direction Method for Linear Programming", LIDS-P-1967, Apr. 1990.
Biskas, P. N., et al., "A decentralized solution to the security constrained DC-OPF problem of multi-area power systems," Power Tech, 2005 IEEE Russia, pp. 1-7, Jun. 2005.
Geoffrion, M., "Generalized Benders decomposition," Journal of Optimization Theory and Applications, 1972, vol. 10, No. 4.
Boyd, S., et al., "Distributed optimization and statistical learning via the alternating direction method of multipliers," Jan. 27, 2011.
Liberti, L., "Introduction to global optimization," Lix, Ecole Polytechnique, Feb. 15, 2008.

(Continued)

*Primary Examiner* — Mohammad Ali
*Assistant Examiner* — Anthony Whittington
(74) *Attorney, Agent, or Firm* — Scully, Scott, Murphy & Presser, P.C.; Daniel P. Morris, Esq.

(57) ABSTRACT

A system, a method and a computer program product for determining an amount of an electric power to be generated in an electric power system and determining a total cost for generating the amount of electric power while satisfying at least one contingency constraint and one or more customer request. The system creates an optimization problem for calculating amount of the electric power to be generated and a total cost for generating the calculated amount of the electric power while meeting the at least one contingency constraint. The system runs the optimization problem in real-time. The system outputs, from the optimization problem, an output specifying the calculated amount of the electric power and the total cost to generate the calculated amount of the electric power.

24 Claims, 5 Drawing Sheets

(56) References Cited

OTHER PUBLICATIONS

Waechter, A., et al., "On the implementation of an interior-point filter line-search algorithm for large-scale nonlinear programming," Math. Program. Ser. A 106, pp. 25-57, Apr. 28, 2005.

Monticelli, A. et al., "Security-Constrained Optimal Power Flow With Post-Contingency Corrective Rescheduling" IEEE Transactions on Power Systems, Feb. 1987, vol. PWRS-2, No. 1.

Captinescu, F., et al., "A New Iterative Approach to the Corrective Security-Constrained Optimal Power Flow Problem", IEEE Transactions on Power Systems, Nov. 2008, vol. 23, No. 4.

Zaoui, F. et al., "A Direct Approach for the Security Constrained Optimal Power Flow Problem", Power Systems Conference and Exposition, 2006, PSCE '06. 2006 IEEE PES, Issue Date: Oct. 29, 2006-Nov. 1, 2006 pp. 1562-1569.

Qiu, W., et al., "A New Parallel Algorithm for Security Constrained Optimal Power Flow with a Nonlinear Interior Point Method", Power Engineering Society General Meeting, 2005. IEEE Issue Date: Jun. 12-16, 2005, pp. 447-453, vol. 1.

Li, Y., et al., "Decomposed SCOPF for Improving Efficiency", IEEE Transactions on Power Systems, Feb. 2009, vol. 24, No. 1.

* cited by examiner

SOLVING LARGE-SCALE SECURITY-CONSTRAINED ECONOMIC DISPATCH PROBLEM IN REAL-TIME

BACKGROUND

The present application generally relates to dispatching energy, e.g., an electric power. More particularly, the present application relates to determining an amount of electric power to be generated and their cost to generate while meeting at least one contingency constraint and one or more customer requests.

Electricity markets in the United States are comprised of two interconnected markets: a day ahead market and a real-time or balancing market. The day-ahead market focuses on an electricity power generation schedule per an electric power generator. The real-time market focuses on economic dispatch, i.e., determining an output of an electric power generator and its cost to generate the electric power.

Currently, linear direct current (DC) approximation of a (nonlinear, non-convex) AC (Alternating Current) power flow equation is mostly used in the existing electric power generation systems. A reference to P. N. Biskas and A. G. Bakirtzis, entitled "A decentralized solution to the security constrained DC-OPF problem of multi-area power systems," Power Tech, 2005 IEEE Russia, pp. 1-7, June 2005, wholly incorporated by reference as if set forth herein, describes the linear direct current approximation of the AC power flow equation in detail. A main drawback of the linear DC approximation is that it does not capture a physical electric power flow more realistically than the AC power flow equation. Currently, solving the AC power flow equation without the linear DC approximation requires large amount of memory usage (e.g., more than one Terabyte, etc.) and cannot be performed in real-time. Currently, the solution of the AC optimal power flow problem is usually a low quality, i.e., far from an optimal solution (i.e., optimality referring to ideal amount of electric power to be generated at an ideal cost to generate the ideal amount of electric power). The linear DC approximation requires trials and errors to ensure a feasibility of its solution and does not provide an optimal solution.

SUMMARY OF THE INVENTION

The present disclosure describes a system, method and computer program product for determining an amount of an electric power to generate in an electric power system and determining a total cost for generating the amount of electric power while satisfying at least one contingency constraint and one or more customer request.

In one embodiment, there is provided a system for determining an amount of an electric power to generate in an electric power system and determining a total cost for generating the amount of electric power while satisfying at least one contingency constraint and one or more customer request. The system includes, but is not limited to: at least one memory device and at least one processor connected to the memory device. The system is configured to create an optimization problem for calculating an amount of the electric power to be generated and a total cost for generating the calculated amount of the electric power while meeting the at least one contingency constraint and the one or more customer request. The contingency constraint includes one or more of: a transmission line failure, a power generator failure, a transformer failure, a structure of a power distribution network, and a topology of the power distribution network. The system is configured to run the optimization problem in real-time. The system is configured to output, from the optimization problem, an output specifying the calculated amount of the electric power and the total cost to generate the calculated amount of the electric power.

In a further embodiment, to run the optimization problem, the system is configured to solve the optimization problem without considering the at least one contingency constraint. The system is configured to check whether a result of the computed optimization problem satisfies the at least one contingency constraint. The system is configured to output the result in response to determining that the result satisfies the at least one contingency constraint. The system is configured to prune, in response to determining that the result does not satisfy the at least one contingency constraint, one or more results of the optimization problem that do not satisfy the at least one contingency constraint. The system is configured to solve the optimization problem with the pruned results.

In a further embodiment, to run the optimization problem, the system is configured to generate a template to solve the optimization problem. The system is configured to reformulate the optimization problem based on the generated template. The system is configured to form an augmented Lagrangian for the reformulated optimization problem. The system is configured to initialize Lagrangian multipliers and decision variables according to the at least one contingency constraint. The system is configured to solve the reformulated optimization problem with the initialized Lagrangian multipliers and decision variables, based on an alternating direction method of multipliers.

In a further embodiment, the system is further configured to break the reformulated optimization problem into one or more sub-problems. The system is configured to solve the one or more sub-problems with the initialized Lagrangian multipliers and decision variables, based on the formed augmented Lagrangian. The system is configured to evaluate whether a solution of the one or more sub-problems meets a stopping criterion. The system is configured to output the solution in response to determining that the solution meets the stopping criterion. The system is configured to update the Lagrangian multipliers based on the solution, in response to determining that the solution does not meet the stopping criterion.

In a further embodiment, to run the optimization problem, the system is configured to build a tree data structure. Each node of the tree data structure describes a possible solution of the optimization problem. The system is configured to compute, at each node of the built tree data structure, an upper bound and lower bound of an objective function. The objective function determines the cost for generating the electric power. The lower bound is calculated from Lagrange duality. The upper bound is calculated from an interior-point method. The system is configured to evaluate, at each node of the built tree data structure, whether the computed upper bound and computed lower bound satisfy a stopping criterion. The system is configured to output the computed upper bound and the computed lower bound in response to determining that the computed upper bound and computed lower bound satisfy the stopping criterion. The system is configured to apply at least one branching procedure on the tree data structure in response to determining that the computed upper bound and computed lower bound do not satisfy the stopping criteria. The system is configured to re-compute the lower bound in a region in the tree data structure branched according to the applied branching procedure. The system is configured to update the upper bound in the region in the tree data structure. The system is configured to delete nodes in the region based on the re-computed the lower bound and updated upper bound or an intersection of the branched region and an original feasible set. The original feasible set refers to possible solutions of the optimization problem satisfying the at least one contingency constraint. The system is configured to repeat the evaluating, the outputting, the applying, the re-computing, the updating, and the deleting.

In a further embodiment, the stopping criterion includes one or more of: a gap between the smallest computed lower bound and the computed upper bound is lower than a predetermined threshold, or the tree data structure is empty.

In a further embodiment, the one or more customer request includes: a demand or load for a certain amount of the electric power.

BRIEF DESCRIPTION OF THE DRAWINGS

The accompanying drawings are included to provide a further understanding of the present invention, and are incorporated in and constitute a part of this specification.

DETAILED DESCRIPTION

In this disclosure, there are provided a method, a system and a computer program product for solving an AC (Alternative Current) electric optimal power flow problem (e.g., problem (1) described below) in real-time to generate an optimal solution. The optimal solution specifies an ideal amount of electric power to be generated and a cost for generating the ideal amount of the electric power while satisfying at least one contingency constraint and one or more customer request. The contingency constraint includes one or more of: a transmission line failure, a power generator failure, a transformer failure, a structure of a power distribution network, and a topology of the power distribution network. The one or more customer request comprises: a demand or load for a certain amount of an electric power, etc. In one embodiment, the customer request, e.g., the demand, is incorporated in the definitions of functions $h_c$ and $g_c$ in problem (1) described below.

Figure 1:
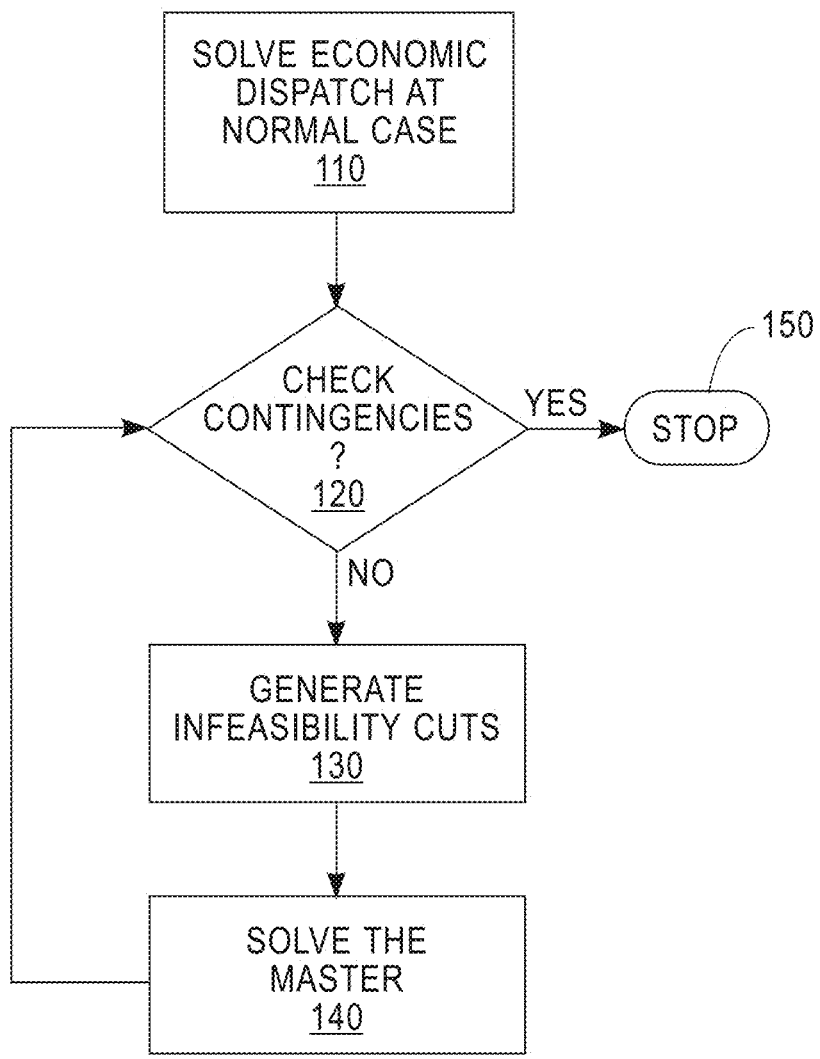
FIG. 1 is a flow chart that describes method steps for solving an optimization problem that calculates an amount of electric power to be generated and a total cost for generating the calculated amount while meeting at least one contingency constraint and one or more customer request in one embodiment.
Figure 2:
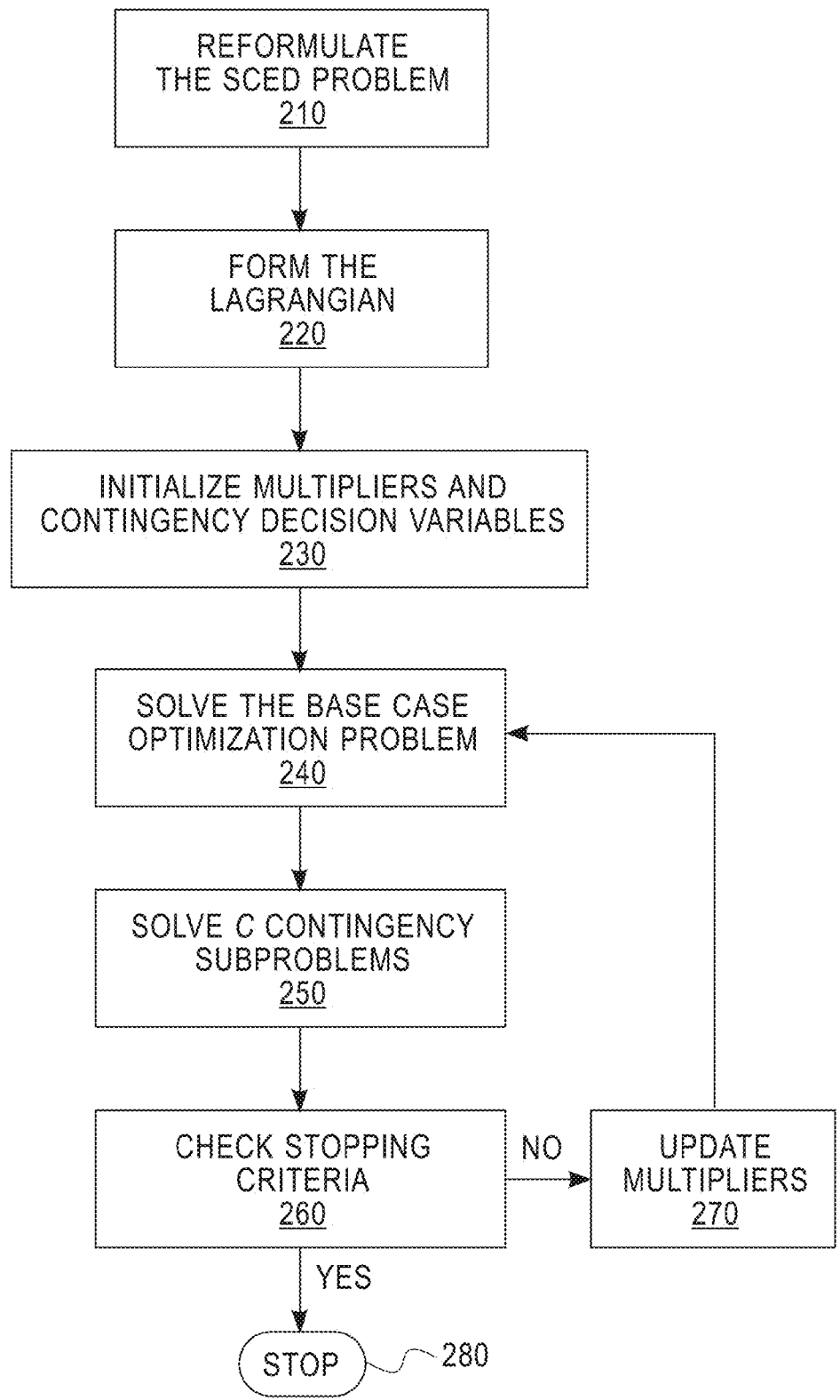
FIG. 2 is another flow chart that describes method steps for solving an optimization problem that calculates an amount of the electric power to be generated and a total cost for generating the calculated amount of the electric power while meeting at least one contingency constraint and the one or more customer request in another embodiment.
Figure 3:
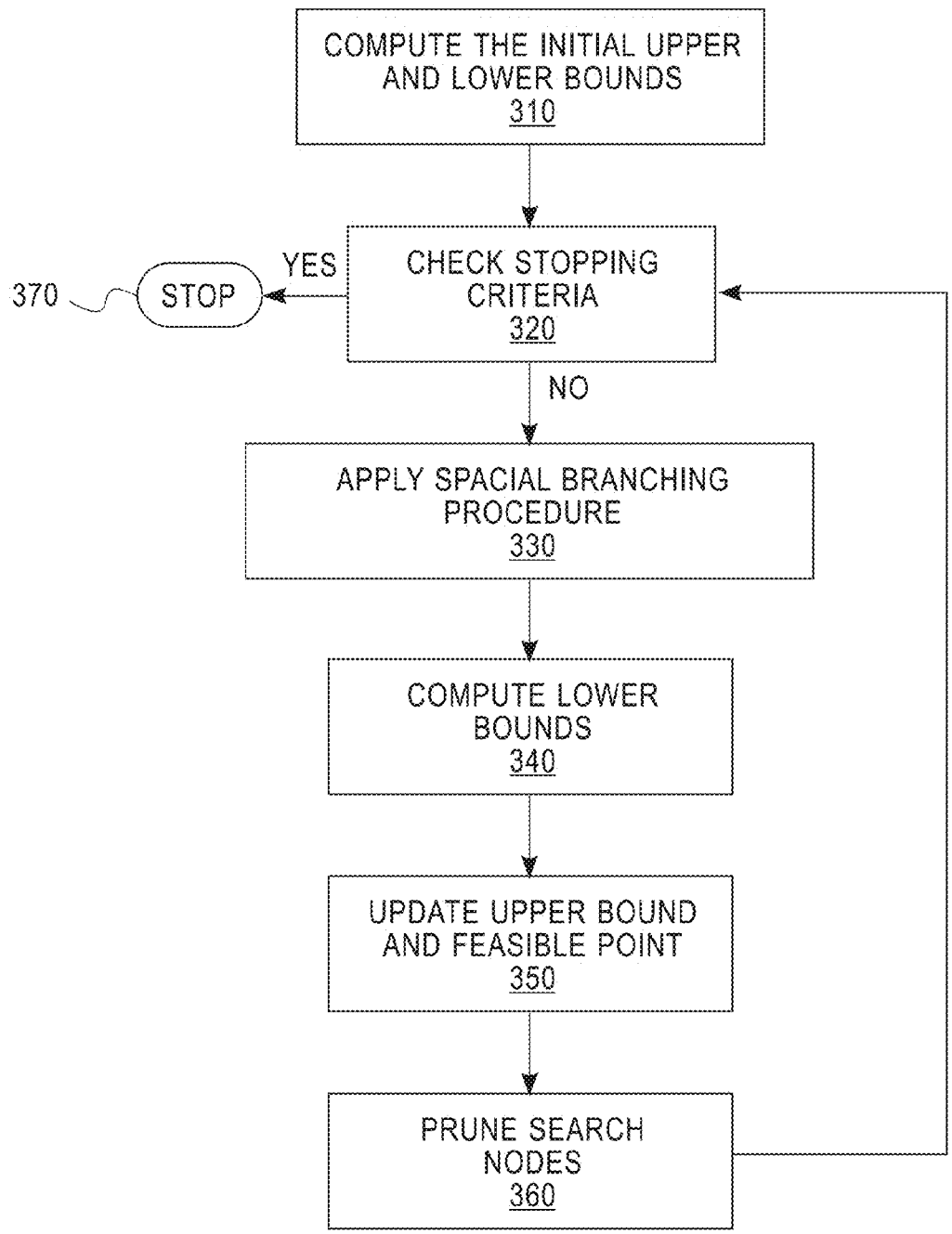
FIG. 3 is another flow chart that describes method steps for solving an optimization problem that calculates amount of electric power to be generated and a total cost for generating the calculated amount electric power while meeting at least one contingency constraint and the one or more customer request in another embodiment.

In one embodiment, to solve the AC electric optimal power flow problem, a computing system (e.g., a computing system 400 shown in FIG. 4) is configured to apply method steps described in FIG. 1 or FIG. 2 or FIG. 3 on the AC electric optimal power flow problem. Method steps described in FIGS. 1-2 are heuristics that generate sub-optimal solutions of the AC electric optimal power flow problem. Method steps described in FIG. 3 generate the optimal solution of the AC electric optimal power flow problem. Benefits of these method steps described in FIGS. 1-3 include, but are not limited to: (1) these method steps can handle a nonlinear non-convex optimization problem (e.g., AC electric optimal power flow problem), which outputs a result that specifies one or more of: (a) amount of electric power to be generated to satisfy the contingency constraint and customers' requests; and (b) a lowest cost to generate the amount of the electric power; (2) The computing system 400 or any traditional computing system can run these method steps in FIGS. 1-3 in real-time; (3) The computing system 400 or traditional computing system can run method steps in FIG. 1 and/or FIG. 2 and/or FIG. 3 in parallel to improve running time of these method steps; and (4) The output from method steps in FIG. 3 can be used to determine quality of outputs of method steps in FIGS. 1-2 because the output from the method steps in FIG. 3 provides the optimal solution of the AC electric optimal power flow problem.

In another embodiment, to solve the AC electric optimal power flow problem, the computing system 400 is configured to utilize one or more of: Benders decomposition algorithm, Alternating direction method of multipliers, and Branch-and-bound algorithm. A reference to A. M. Geoffrion, "Generalized Benders decomposition," Journal of Optimization Theory and Applications, vol. 10, no. 4, 1972, wholly incorporated by reference as set forth herein, describes Benders decomposition algorithm in detail. A reference to N. Parikh, et al., "Distributed optimization and statistical learning via the alternating direction method of multipliers," Jan. 27, 2011, wholly incorporated by reference as set forth herein, describes alternating direction method of multipliers in detail. A reference to Leo Liberti, "Introduction to global optimization," Lix, Ecole Polytechnique, Feb. 15, 2008, wholly incorporated by reference as set forth herein, describes Branch-and-bound algorithm in detail.

By solving the AC electric optimal power flow problem, e.g., by running the method steps in FIG. 1 or FIG. 2 or FIG. 3, the computing system 400 solves a security-constrained economic dispatch problem (i.e., determining an amount of electric power to be generated under a constraint) because the output of the method steps in FIG. 1 or FIG. 2 or FIG. 3 specifies an amount of electric power to be generated per an electric power generator and a cost to operate the generator and a cost to generate the electric power under the contingency constraint. By running method steps in FIG. 1 or FIG. 2 or FIG. 3, an electric power company (e.g., Con Edison®, etc.) can provide electric power reliably to all of its customers even though there exists an occurrence of a transmission line failure, an electric power generator failure or a transformer failure.

The AC electric optimal power flow problem can be formulated as follows:

$$\min f(u_0)$$

$$s.t.\ h_c(x_c, u_c) = 0$$

$$g_c(x_c, u_c) \leq 0$$

$$|u_c^i - u_0^i| \leq \Delta u_i^{max}, i \in G, c = 0, \ldots, C, \quad (1)$$

where c=0 represents an electric power system at a normal case (i.e., no occurrence of contingency constraint), c=1, . . . , C, is a variable representing a contingency constraint, $x_c$ is a vector of state variables (e.g., complex voltages) for a c-th configuration, $u_c$ is a vector of control variables (e.g., the active and reactive powers, etc.), a generation cost $f(u_0)=\Sigma_{i\in G}(c_{0i}(u_0^i)^2+C_{1i}u_0^i+c_{2i})$ with cost parameters $c_{0i}$, $c_{1i}$, $c_{2i}\geq 0$ (G is a set of generators), and C is the number of contingency constraints. $\Delta u_i^{max}$ is a pre-determined maximal allowed variation of control variables, and $h_c$ and $g_c$ are operational constraints including AC power flow balance equations (e.g., $P_1+P_2+P_3=0$, where $P_1$ represents an electric power at an electric node "1," $P_2$ represents an electric power at an electric node "2," $P_3$ represents an electric power at an electric node "3."). Note that the optimization problem (i.e., the problem (1)) allows control variables to be reinitialized in order to satisfy contingency constraints. The problem (1) is advantageously solved in real-time.

Figure 5:
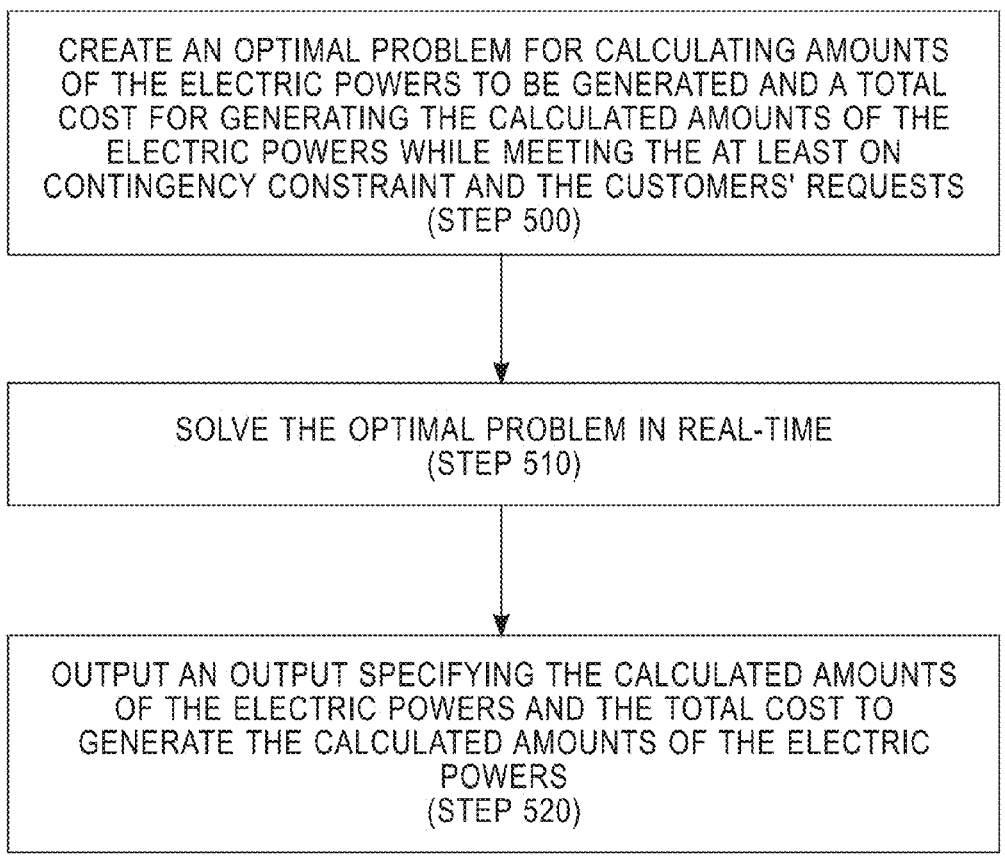
FIG. 5 is a flow chart for determining an amount of an electric power to generate in an electric power system and determining a total cost for generating the amount of electric power while satisfying at least one contingency constraint and one or more customer request in one embodiment.

FIG. 5 is a flow chart that describes method steps for determining an amount of an electric power to generate in an electric power system and determining a total cost for generating the amount of electric power while satisfying at least one contingency constraint and one or more customer request in one embodiment. At step 500, the computing system 400 is configured to create the optimization problem (e.g., the problem (1) described above) for calculating an amount of the electric power to be generated and a total cost for generating the calculated amount of the electric power while meeting the at least one contingency constraint and the one or more customer request. At step 510, the computing system is configured to solve the optimization problem in real-time, e.g., by running the method steps in FIG. 1 or FIG. 2 or FIG. 3. The computing system is configured to output, from the optimization problem, an output specifying the calculated amount of the electric power and the total cost to generate the calculated amount of the electric power.

By running method steps in FIG. 1, the computing system 400 is configured to decompose the optimization problem into a master problem (e.g., the problem (10) described below) and sub-problems (e.g., problems (5) and (6) described below). The computing system 400 is configured to check a feasibility of a solution of each sub-problem for the master problem. This feasibility check can be performed in parallel, e.g., by using two or more processors 411 in the computing system 400. Method steps in FIG. 1 can also solve the optimization problem even if the optimization problem is non-convex. By running method steps in FIG. 2, the computing system 400 is configured to improve quality of the solution from method steps in FIG. 1.

FIG. 1 is a flow chart that describes method steps for solving the optimization problem in one embodiment. At step 110, the computing system 400 is configured to compute the optimization problem without considering the contingency constraint. In one embodiment, the optimization problem (1) is expressed as a general nonlinear non-convex optimization problem:

$$\min f(x)$$

$$s.t. \ x\in X$$

$$G(y)\leq 0$$

$$H(y)=0$$

$$Ax+By+b\leq 0$$

$$y^L\leq y\leq y^U, \quad (2)$$

where $X\subset P^n$ and $y\in P^m$, A and B are matrices. In one embodiment, f is a convex function, whereas G, H and X are non-convex, b is a constant vector, $y^L$ is a lower bound of the variable y, and the $y^U$ is an upper bound of the variable y.

An initial master problem is of the problem (2) is as follows:

$$\min f(x)$$

$$x\in X. \quad (3)$$

Let $\bar{x}$ be a solution of the initial master problem. Then, the computing system 400 is configured to check if the following subproblem is feasible $$G(y)\leq 0$$

$$H(y)=0$$

$$A\bar{x}+By+b\leq 0$$

$$y^L\leq y\leq y^U. \quad (4)$$

Note that each contingency constraint associated with each c in the problem (1) may be written in a form of problem (4).

Returning to FIG. 1, at step 120, the computing system is configured to check whether a result of the computed optimization problem (e.g., problem (3)) satisfies the contingency constraint described above, e.g., by running problem (4). Note that the optimization problem (1) can be compactly expressed as the problem (2). Each contingency constraint associated with c in the problem (1) can be expressed in the form of problem (4). So, checking the contingency constraint for each c is equivalent to evaluating the feasibility of the problem (4). In response to determining that the result satisfies the contingency constraint, the system is configured to output the result. In other words, if the equation (4) is feasible for the given $\bar{x}$, at step 150, the computing system 400 terminates running the method steps in FIG. 1. Otherwise, at step 130, the computing system 400 is configured to prune, in response to determining that the result does not satisfy the contingency constraint, one or more results of the computed optimization problem (e.g., problem (3)) that do not satisfy the contingency constraint. To prune the one or more results, the computing system 400 is configured to generate a cut that is added to the initial master problem (e.g., problem (3)).

To check the feasibility of the problem (4) or generate the cut, the computing system is configured to solve, for the fixed $\bar{x}$, a sub-problem $$\min_{y,\alpha_i} \sum_i \alpha_i \quad (5)$$

subject to:

$$G(y)\leq 0$$

$$H(y)=0$$

$$A\bar{x}+By+b-\alpha\leq 0$$

$$y^L\leq y\leq y^U$$

$$\alpha\geq 0,$$

where $\alpha_i$ is a new slack variable.

Assume, in one embodiment, that an optimal result of the problem (5) is strictly positive, i.e., the problem (4) is infeasible, i.e., for the given $\bar{x}$, there is no y satisfying constraints (4). Further in one embodiment, it is assumed that $(\bar{y},\bar{\alpha})$ is an optimal solution of the problem (5). Then, by substituting $z\approx y-y^L$ and using the Taylor expansions of G(y) and H(y) at $\bar{y}-y^L$, the computing system is configured to obtain a relaxed linear programming:

$$\min_{\alpha,z} \sum_i \alpha_i \qquad (6)$$

$$G(\bar{y}) + \nabla_y G(\bar{y})(z - (\bar{y} - y^L)) \leq 0$$

$$H(\bar{y}) + \nabla_y H(\bar{y})(z - (\bar{y} - y^L)) = 0$$

$$Bz - \alpha + A\bar{x} + b + By^L \leq 0$$

$$z \leq y^U - y^L$$

$$\alpha, z \geq 0.$$

For a general optimization problem, the problem (5) can be still infeasible if the computing system is configured to introduce the auxiliary variable $\alpha$ for a constraint $A\bar{x}+By+b-\alpha \leq 0$. To construct a new optimization problem whose feasible set is definitely non-empty, the computing system is configured to consider constraints $G(y) \leq 0$ and $H(y)=0$. However, in an electric power system analysis, for $\alpha$ is large enough (e.g., larger than 1000, etc.), the problem (5) is feasible.

Assume that an optimal result of the problem (6) is strictly positive. The computing system 400 is configured to construct linear cuts (e.g., equations (7) and (8)-(9) below) based on Lagrange multipliers arising from the problems (5) or (6). Lagrange multipliers refer to a method that finds a maximum and a minimum of a function subject to contraints. Yan-Bin Jia, "Lagrange Multipliers," Nov. 18, 2008, wholly incorporated by reference as if set forth herein, describes Lagrange multipliers in detail. Note that if the optimal result of the problem (6) is strictly positive, then (4) is infeasible, since the optimal result of the problem (6) is less than or equal to the optimal result of the problem (5).

In solving the optimization problem under one or more constraints, it is possible to convert the optimization problem (e.g., problem (6)) to a dual problem (e.g., Lagrangian dual problem, etc.). The Lagrangian dual problem is formulated by using Lagrangian multipliers to incorporate the constraints to an objective function. A reference to Eric P. Xing and Guang Xiang, entitled "Optimal Margin Principle and Lagrangian Duality," 2007, Carnegie Mellon University, wholly incorporated by reference as if set forth herein, describes Lagrangian dual problem in detail.

The Lagrange dual problem of the problem (6) is as follows:

$$\max_{\pi \geq 0, \mu \geq 0, \eta} \min_{\substack{0 \leq \alpha \\ 0 \leq z \leq y^U - y^L}} \sum_i \alpha_i + \pi^T(Bz - \alpha + A\bar{x} + By^L + b) +$$

$$\eta^T(H(\bar{y}) + \nabla_y H(\bar{y})(z - (\bar{y} - y^L))) + \mu^T(G(\bar{y}) + \nabla_y G(\bar{y})(z - (\bar{y} - y^L))) =$$

$$\max_{\pi \geq 0, \mu \geq 0, \eta} \min_{\substack{0 \leq \alpha \\ 0 \leq z \leq y^U - y^L}} \sum_i \alpha_i(1 - \pi_i) + (B^T\pi + \nabla_y^T H(\bar{y})\eta + \nabla_y^T G(\bar{y})\mu)^T z + \pi^T(A\bar{x} + By^L + b) -$$

$$\eta^T \nabla_y H(\bar{y})(\bar{y} - y^L) + \mu^T(G(\bar{y}) - \nabla_y G(\bar{y})(\bar{y} - y^L)) =$$

$$\max_{0 \leq \pi_i \leq 1, \mu \geq 0} \pi^T(A\bar{x} + By^L + b) - \eta^T \nabla_y H(\bar{y})(\bar{y} - y^L) + \mu^T(G(\bar{y}) - \nabla_y G(\bar{y})(\bar{y} - y^L)) + \sum_i l_i(\pi),$$

where $$l_i(\pi) = \begin{cases} 0 & \text{if } [B^T\pi + \nabla_y^T H(\bar{y})\eta + \nabla_y^T G(\bar{y})\mu]_i \geq 0 \\ [B^T\pi + \nabla_y^T H(\bar{y})\eta + \nabla_y^T G(\bar{y})\mu]_i [y^U - y^L]_i & \text{otherwise}, \end{cases}$$

and $\pi$, $\mu$, $\eta$, and z, are new decision variables. Suppose that $(\bar{\pi}, \bar{\eta}, \bar{\mu})$ is the optimal solution to the dual problem. By applying Lagrangian duality to the problem (6), the computing system 400 is configured to obtain $$\bar{\pi}^T(A\bar{x} + By^L + b) + \bar{\eta}^T \nabla_y H(\bar{y})(\bar{y} - y^L) +$$

$$\bar{\mu}^T(G(\bar{y}) - \nabla_y G(\bar{y})(\bar{y} - y^L)) + \sum_i l_i(\bar{\pi}) = \sum_i \alpha_i^*.$$

Note that $\Sigma_i l_i(\bar{\pi}) \leq 0$. Together with the strict positiveness of $\Sigma_i \alpha^*_i$, follows that $$\bar{\pi}^T(A\bar{x}+By^L+b) - \bar{\eta}^T \nabla_y H(\bar{y})(\bar{y}-y^L) + \bar{\mu}^T(G(\bar{y}) - \nabla_y G(\bar{y})(\bar{y}-y^L)) > 0.$$

Hence, the computing system 400 is configured to construct a first cut as follows:

$$\bar{\pi}^T(A\bar{x}+By^L+b) - \bar{\eta}^T \nabla_y H(\bar{y})(\bar{y}-y^L) + \bar{\mu}^T(G(\bar{y}) - \nabla_y G(\bar{y})(\bar{y}-y^L)) > 0, \qquad (7)$$

which is an affine function of x. An affine function refers to a linear transformation using a matrix and a vector.

The computing system 400 can be configured to create another Lagrange dual problem for the problem (6) as follows:

$$\max_{\substack{\pi \geq 0, \mu \geq 0 \\ \eta}} \min_{\alpha, z \geq 0} \sum_i \alpha_i + \pi^T(Bz - \alpha + A\bar{x} + By^L + b) +$$

$$\eta^T(H(\bar{y}) + \nabla_y H(\bar{y})(z - (\bar{y} - y^L))) +$$

$$\mu^T(G(\bar{y}) + \nabla_y G(\bar{y})(z - (\bar{y} - y^L))) \max_{\substack{\pi \geq 0, \mu \geq 0 \\ \eta}} \min_{\alpha, z \geq 0} \sum_i \alpha_i(1 - \pi_i) +$$

$$(B^T\pi + \nabla_y^T H(\bar{y})\eta + \nabla_y^T G(\bar{y})\mu + \theta)^T z + \pi^T(A\bar{x} + By^L + b) -$$

$$\eta^T \nabla_y H(\bar{y})(\bar{y} - y^L) + \mu^T(G(\bar{y}) - \nabla_y G(\bar{y})(\bar{y} - y^L)) =$$

$$\max_{0 \leq \pi_i \leq 1, \mu \geq 0} \pi^T(A\bar{x} + By^L + b) - \eta^T \nabla_y H(\bar{y})(\bar{y} - y^L) +$$

$$\mu^T(G(\bar{y}) - \nabla_y G(\bar{y})(\bar{y} - y^L)) - \theta^T(y^U - y^L) =$$

$$\max_{\substack{1 \geq \pi_i \geq 0 \\ \mu, \theta \geq 0, \eta \\ B^T\pi + \nabla_y^T H(\bar{y})\eta + \theta \geq 0}} \pi^T(A\bar{x} + By^L + b) - \eta^T \nabla_y H(\bar{y})(\bar{y} - y^L) +$$

$$\mu^T(G(\bar{y}) - \nabla_y G(\bar{y})(\bar{y} - y^L)) - \theta^T(y^U - y^L),$$

where $\theta$ is a new decision variable.

Again, suppose that $(\hat{\pi},\hat{\eta},\hat{\mu},\hat{\theta})$ is the optimal solution to the dual problem. By solving the Lagrangian dual problem of the problem (6), the computing system is configured to obtain $$\hat{\pi}^T(A\bar{x}+By^L+b)-\hat{\eta}^T\nabla_y H(\bar{y})(\bar{y}-y^L)+$$
$$\hat{\mu}^T(G(\bar{y})-\nabla_y G(\bar{y})(\bar{y}-y^L))-\hat{\theta}^T(y^U-y^L)=\sum_i \alpha_i^* > 0$$

that implies a second cut as follows:

$$\hat{\pi}^T(A\bar{x}+By^L+b)-\hat{\eta}^T\nabla_y H(\bar{y})(\bar{y}-y^L)+\hat{\mu}^T(G(\bar{y})-\nabla_y G(\bar{y})(\bar{y}-y^L))-\hat{\theta}^T(y^U-y^L)\le 0. \quad (8)$$

Motivated by equations (7) and (8), the computing system 400 is configured to obtain a third cut (e.g., equation (9)), provided that the optimal result of (5) is strictly positive, i.e., (4) is infeasible. Denote $(\tilde{\pi},\tilde{\mu},\tilde{\eta})$ by the Lagrange multipliers in the nonlinear optimization problem (5). The third cut is as follows:

$$\tilde{\pi}^T(Ax+By^L+b)-\tilde{\eta}^T\nabla_y H(\bar{y})(\bar{y}-y^L)-\tilde{\mu}^T\nabla_y G(\bar{y})(\bar{y}-y^L)\le 0. \quad (9)$$

By using these cuts (e.g., equations (7)-(9)), the computing system 400 is configured to prune one or more results of the optimization problem (e.g., problem (5) or problem (6)). Returning to FIG. 1, at step 140, the computing system 400 is configured to solve the optimization problem (e.g., problem (5) or problem (6)) to obtain the pruned result. In one embodiment, the master optimization problem with the pruned result is as follows:

$$\min f(u_0)$$
$$g_0(x_0,u_0)\le 0$$
$$h_0(x_0,u_0)=0$$
$$Pu_0+q\le 0, \quad (10)$$

where $Pu_0+q\le 0$ includes the feasibility cuts (e.g., equations (7)-(9)) with P is a matrix, q is a vector.

In other words, by running the method steps in FIG. 1, the computing system 400 is first configured to solve the problem (11) to get $(X_0^{(1)}, U_0^{(1)})$ ($x_0^{(1)}$ and $u_0^{(1)}$ are solutions obtained by solving the equation (11).)

$$\min f(u_0)$$
$$g_0(x_0,u_0)\le 0$$
$$h_0(x_0,u_0)=0$$

Then, for an iteration k=1, 2, . . . and each contingency c=1, . . . , C, the computing system 400 is configured to solve the problem (5) for a given $(x_0^{(k)},u_0^{(k)})$. $\Sigma_i\alpha_i>0$, the computing system 400 is configured to add the third cut (e.g., equation (9)) into the problem (10). If $\Sigma_i\alpha_i=0$ for all c=1, . . . , C, the computing system is configured to terminate the method steps in FIG. 1. Otherwise, if $\Sigma_i\alpha_i\ne 0$, the computing system 400 is configured to solve the problem (10) after adding the cut (e.g., equation (7) or (8) or (9)) to obtain $(x_0^{(k+1)},u_0^{(k+1)})$. By solving problem (10), the computing system 400 is configured to output a result that specifies an amount of electric power to be generated to meet the one or more customer request under the contingency constraint and a lowest cost to generate the amount of the electric power.

In one embodiment, the computing system is configured to utilize one or more of these cuts (e.g., equations (7)-(9)) in an adaptive manner. For example, in one embodiment, if it is supposed that $c(x)\le 0$ is a valid cut for $\bar{x}$, then $c(x)-\alpha c(\bar{x})\le 0$, for any $\alpha<1$ is also a cut. By choosing a adaptively based on a constraint infeasibility measure for $\bar{x}$, for example, the measurement can be an optimal result of the problem (5), the quality of the solution of the optimization problem (1) can be improved. The idea is that if the constraint infeasibility measure is large (e.g. larger than 10, etc.), the computing system 400 is configured to select $\alpha$ close to 1, otherwise the computing system 400 is configured to select $\alpha$ close to 0.

FIG. 2 is a flow chart that describes method steps for solving the optimization problem (1) that calculates amount of the electric power to be generated and a total cost for generating the calculated amount of the electric power while meeting at least one contingency constraint and one or more customer request in one embodiment.

The computing system 400 is configured to generate a template to solve the optimization problem (e.g., problem (1)). An example of the template includes, but is not limited to:

$$\min\{F(x)+G(y):Mx+Ny=d,x\in X,y\in Y\}, \quad (14)$$

where $x\in P^n$, $y\in P^m$, $M\in P^m$, $M\in P^{p\times n}$, $N\in P^{p\times m}$ and $d\in P^p$. Assume that F and G are closed, convex, and differentiable functions, and X and Y are closed and nonconvex sets.

The computing system 400 is configured to form an augmented Lagrangian for the problem (14) as follows:

$$L_\beta(x,y,\lambda) = F(x)+G(y)+\lambda^T(Mx+Ny-d)+\frac{1}{2}\beta\|Mx+Ny-d\|^2, \quad (15)$$

where $\beta>0$.

A classical augmented Lagrangian multiplier method involves a joint optimization and multiplier update step:

$$(x^{k+1},y^{k+1}):=\text{argmin}_{x\in X,y\in Y}L_\beta(x,y,\lambda^k)$$

$$\lambda^{k+1}=\lambda^k+\beta(Mx^{k+1}+Ny^{k+1}-d).$$

The computing system 400 is configured to iterate:

$$x^{k+1}:=\text{argmin}_{x\in X}L_\beta(x,y^k,\lambda^k)$$

$$y^{k+1}:=\text{argmin}_{y\in Y}L_\beta(x^{k+1},y^k,\lambda^k)$$

$$\lambda^{k+1}=\lambda^k+\beta(Mx^{k+1}+Ny^{k+1}-d),$$

where $x^*:=\text{argmin}_{x\in\Omega}f(x)$ means $x^*$ is the optimal solution of min f(x) s.t. $x\in\Omega$.

At step 210 in FIG. 2, in a further embodiment, the system is configured to reformulate the optimization problem (1) based on the generated template. In particular, the optimization problem (1) can be reformulated, e.g., by introducing an auxiliary variable $u_{0c}$ as follows:

$$\min f(u_0)$$
$$s.t.\ h_0(x_0,u_0)=0$$
$$g_0(x_0,u_0)\le 0$$
$$h_c(x_c,u_c)=0$$
$$g_c(x_c,u_c)\le 0$$
$$|u_c^i-u_{0c}^i|\le\Delta u_i^{max}, i\in G, c=1,\ldots,C$$
$$u_0^i-u_{0c}^i=0, i\in G, c=1,\ldots,C.$$

Consider that:

$$x:=(x_0,u_0), y:=(x_1,u_1,\ldots,x_C,u_C)$$

$$F(x) := f(u_0), G(y) := 0$$

$$X := \{(x_0, u_0) : h_0(x_0, u_0) = 0, g_0(x_0, u_0) \leq 0\}$$

$$Y := (Y_1, \ldots, Y_C),$$

where $Y_c := \{(x_c, u_c, u_{0c}) : h_c(x_c, u_c) = 0, g_c(x_c, u_c) \leq 0 | u_c^i - u_{0c}^i | \leq \Delta u_i^{max}, i \in G\}, c = 1, \ldots, C$ $$Mx + Ny = d : u_0 - u_{0c} = 0, c = 1, \ldots, C \quad (17)$$

$$M := \begin{bmatrix} 1 & 0 & \cdots & 0 \\ 0 & 1 & \cdots & 0 \\ \vdots & & \ddots & \vdots \\ 0 & \cdots & 0 & 1 \end{bmatrix}, N := -\begin{bmatrix} 1 & 0 & \cdots & 0 \\ 0 & 1 & \cdots & 0 \\ \vdots & & \ddots & \vdots \\ 0 & \cdots & 0 & 1 \end{bmatrix}, d = \begin{bmatrix} 0 \\ \vdots \\ 0 \end{bmatrix}.$$

Returning to FIG. 2, at step 220, the computing 400 is configured to form the Lagrangian for the reformulated optimization problem (16):

$$L_\beta(x, y, \lambda) = f(u_0) + \sum_{c=1}^{C} \lambda_c(u_0 - u_{0c}) + \frac{\beta}{2} \sum_{c=1}^{C} \|u_0 - u_{0c}\|^2$$

where $\beta > 0$.

The computing system 400 is configured to iterate, based on an alternating direction method of multipliers, as follows:
For $k = 1, 2, \ldots$ $$\left(x_0^{(k+1)}, u_0^{(k+1)}\right) =$$

$$argmin_{(x_0, u_0) \in X} f(u_0) + \sum_c \lambda_c^{(k)}(u_0 - u_{0c}^{(k)}) + \frac{\beta}{2} \sum_c \|u_0 - u_{0c}^{(k)}\|^2$$

$$\left(x_c^{(k+1)}, u_c^{(k+1)}, u_{0c}^{(k+1)}\right) = argmin_{(x_c, u_c, u_{0c}) \in Y_c} \sum_c \lambda_c^{(k)}\left(u_0^{(k+1)} - u_{0c}\right) +$$

$$\frac{\beta}{2} \sum_c \|u_0^{(k+1)} - u_{0c}\|^2, c = 1, \ldots, C$$

$$\lambda_c^{(k+1)} = \lambda_c^{(k)} + \beta\left(u_0^{(k+1)} - u_{0c}^{(k+1)}\right), c = 1, \ldots, C,$$

The computing system solves the optimization problem (1) to determine $(x_0, u_0)$, where $x_0$ are voltages, $u_0$ are the amount of an electric power generated at generators. The final iterate $(x_0^{(k+1)}, u_0^{(k+1)})$ provides $(x_0, u_0)$.

Returning to FIG. 2, at step 230, the computing system 400 is configured to initialize Lagrangian multipliers and decision variables according to each contingency constraint: $u_{0c}^{(1)}, \lambda_c^{(1)}, c = 1, \ldots, C$.

At step 240, the computing system 400 is configured to solve the reformulated optimization problem (e.g., problem (16), "base case optimization problem" shown at step 240 in FIG. 2) with the initialized Lagrangian multipliers and decision variables of contingencies:

$$\left(x_0^{(k+1)}, u_0^{(k+1)}\right) =$$

$$argmin_{(x_0, u_0) \in X} f(u_0) + \sum_c \lambda_c^{(k)}\left(u_0 - u_{0c}^{(k)}\right) + \frac{\beta}{2} \sum_c \|u_0 - u_{0c}^{(k)}\|^2$$

At step 250, the computing system 400 is further configured to break the reformulated optimization problem (e.g., equation (16)) into one or more sub-problems, which can be run in parallel. The computing system 400 is configured to solve the one or more sub-problems with the initialized Lagrangian multipliers and decision variables of the base case (e.g., problem (16)), based on the formed augmented Lagrangian.

$$\left(x_c^{(k+1)}, u_c^{(k+1)}, u_{0c}^{(k+1)}\right) = argmin_{(x_c, u_c, u_{0c}) \in Y_c} \sum_c \lambda_c^{(k)}\left(u_0^{(k+1)} - u_{0c}\right) +$$

$$\frac{\beta}{2} \sum_c \|u_0^{(k+1)} - u_{0c}\|^2, c = 1, \ldots, C$$

At step 260, the computing system 400 is configured to evaluate whether a solution of the one or more sub-problems meets a stopping criterion. The stopping criterion includes, but is not limited to: a gap between $u_0^{(k+1)}$ and $u_{0c}^{(k+1)}$ is lower than a pre-determined threshold for all $c = 1, \ldots, C$.

At step 280, the computing system 400 is configured to output the solution in response to determining that the solution meets the stopping criterion. The solution specifies ideal amount of electric power to be generated to meet the customers' requests under the contingency constraint and a lowest cost to generate the ideal amount of the electric power. At step 270, the computing system 400 is configured to update the Lagrangian multipliers based on the solutions from steps 270 and 280, in response to determining that the solution does not meet the stopping criterion, and the process returns to step 240.

FIG. 3 is a flow chart that describes method steps for solving an optimization problem that calculates amount of the electric power to be generated and a total cost for generating the calculated amount of the electric power while meeting at least one contingency constraint and one or more customer request in one embodiment. At step 310, the computing system 400 is configured to build a tree data structure (not shown). Each node of the tree data structure describes a possible solution of the optimization problem (e.g., problem (1)). The system is configured to compute, at each node of the built tree data structure, an upper bound and lower bound of a function (e.g., an objective function of the problem (1)). The function determines an amount of electric power to be generated to meet the one or more customer request under the contingency constraint and a cost for generating the amount of the electric power. The lower bound is calculated from Lagrange dual problem (i.e., Lagrange duality). The upper bound is calculated from an interior-point method. A reference to Andreas Wachter, et al., "On the implementation of an interior-point filter line-search algorithm for large-scale nonlinear programming," Math. Program. Ser. A 106, pp. 25-57, Apr. 28, 2005, wholly incorporated by reference as set forth herein, describes interior-point method in detail. At step 320, the computing system 400 is configured to evaluate, at each node of the built tree data structure, whether the computed upper bound and computed lower bound satisfy a stopping criterion. The stopping criterion includes, but is not limited to, one or more of: a gap between a smallest computed lower bound and the computed upper bound is lower than a pre-determined threshold, and the tree data structure is empty. At step 370, the computing system 400 is configured to output the computed upper bound and the computed lower bound in response to determining that the computed upper bound and smallest computed lower bound satisfy the stopping criterion or the tree data structure is empty.

In one embodiment, the computing system 400 is configured to divide the feasible set by using rectangular bisection or ellipsodial bisection to form the tree data structure. If an optimization problem min f(x) s.t. $x \in \Omega$, then $\Omega$ is called the feasible set. Consider an electric power system with N nodes where $P_i^G$ and $Q_i^G$ are dispatchable active and reactive powers, $P_i^D$ and $Q_i^D$ are active and reactive power demands at node i. Denote Γ by a set of electric power generators and Δ by a set of demand buses, whereas T is a set of transmission lines. Every complex nodal voltage can be written in rectangular form $V_i = e_i + if_i$, for all i∈N, where i is the imaginary unit, $e_i$ is the real part of the complex nodal voltage $V_i$, and $f_i$ the imaginary part of the complex nodal voltage $V_i$. In an electric power system analysis, power system networks can be represented as graphs where electrical nodes correspond to graph nodes, transmission lines are graph edges. In turn, each graph can be expressed as an admittance matrix Y. The complex elements at row i and column j of the matrix Y are as follows: $Y_{ij} = g_{ij} + ib_{ij}$, where $G = (g_{ij})$ is a conductance matrix, and $B = (b_{ij})$ is a susceptance matrix. Conductance matrix and susceptance matrix represent the physical characteristics, e.g. resistance and reactance, of an electric power network between electric transmission lines i and j. From Kirchoffs law, electric power flow equations at each node i can be formulated as the following quadratic equations:

$$\sum_{j \in N} (e_i(g_{ij}e_j - b_{ij}f_j) + f_i(g_{ij}f_j + b_{ij}e_j)) = P_i^G - P_i^D,$$

$$\sum_{j \in N} (f_i(g_{ij}e_j - b_{ij}f_j) + e_i(g_{ij}f_j + b_{ij}e_j)) = Q_i^G - Q_i^D.$$

An upper limit constraint on an active electric power flow in a transmission line (i,j) is represented as follows:

$$P_{ij} = (e_if_j - e_jf_i)b_{i,j} + (e_i^2 + f_i^2 - e_ie_j - f_if_j)g_{ij} \le P_{ij}^{max},$$

where $P_{ij}^{max}$ is the maximum active (MW) electric power flow in the transmission line (i,j).

A node "1" is selected as a reference node, which implies from a zero angular condition at this reference node that $f_1 = 0$. Taking into account the physical and operational limits to insure secure operating states for both the pre-contingency (normal case) constraints and post-contingency constraints, this leads to the optimization problem:

$$\min_{e_i^c, f_i^c, P_i^{G,c}, Q_i^{G,c}} \sum_{i \in \Gamma} c_{0i}(P_i^{G,0})^2 + c_{1i}P_i^{G,0} + c_{2i} \quad (18)$$

subject to (for c = 0, ... , C):

$$\sum_{j \in N} (e_i^c(g_{ij}^c e_j^c - b_{ij}^c f_j^c) + f_i^c(g_{ij}^c f_j^c + b_{ij}^c e_j^c)) = P_i^{G,c} - P_i^D, i \in N \quad (19)$$

$$\sum_{j \in N} (f_i^c(g_{ij}^c e_j^c - b_{ij}^c f_j^c) + e_i^c(g_{ij}^c f_j^c + b_{ij}^c e_j^c)) = Q_i^{G,c} - Q_i^D, i \in N \quad (20)$$

$$(e_i^c f_j^c - e_j^c f_i^c) b_{i,j}^c + ((e_i^c)^2 + (f_i^c)^2 - e_i^c e_j^c - f_i^c f_j^c) g_{ij}^c \le P_{ij}^{max}, (i,j) \in T \quad (21)$$

$$f_1^c = 0 \quad (22)$$

$$P_i^{min} \le P_i^{G,c} \le P_i^{max}, i \in \Gamma \quad (23)$$

$$Q_i^{min} \le Q_i^{G,c} \le Q_i^{max}, i \in \Gamma \quad (24)$$

$$(V_i^{min})^2 \le (e_i^c)^2 + (f_i^c)^2 \le (V_i^{max})^2, i \in N \quad (25)$$

$$|P_i^{G,c} - P_i^{G,0}| \le \Delta P_i, i \in \Gamma \quad (26)$$

$$|Q_i^{G,c} - Q_i^{G,0}| \le \Delta Q_i, i \in \Gamma, \quad (27)$$

where $P_i^{min}$ and $P_i^{max}$ are active power generation limits, $Q_i^{min}$ and $Q_i^{max}$ are reactive power generation limits, $V_i^{min}$ and $V_i^{max}$ are voltage limits. $\Delta P_i$ and $\Delta Q_i$ are pre-determined maximal allowed variation of control variables, $c_{0i}$, $c_{1i}$, and $c_{2i}$ are cost parameters, and index c represents a contingency c.

Let Ω be a feasible set defined by equations (19)-(27) and assume Ω is non-empty. An immediate result can be deduced is that Ω is a compact and non-convex set. Note that the problem defined by (18)-(27) is a continuous optimization problem with a convex quadratic objective subject to non-convex quadratic constraints. Decision variables is required to satisfy the non-convex quadratic constraints. The optimization problem (18)-(27) is equivalent to $$\min \sum_{i \in \Gamma} c_{0i}(P_i^G)^2 + c_{1i}P_i^G + c_{2i}$$

subject to the constraints (19)-(27)

$$\sum_{i \in N} ((e_i^c)^2 + (f_i^c)^2) \le \sum_{i \in N} (V_i^{max})^2, c = 0, \ldots, C. \quad (28)$$

The equations (23)-(24) represent constraints associated with the rectangular branch and bound algorithm. The equation (28) represents a constraint associated with the ellipsoidal branch and bound algorithm. The rectangular branch and bound algorithm and the elliposoidal branch and bound algorithm are described in detail below.

Returning to FIG. 3, at step 330 the system is configured to apply at least one branching procedure on the tree data structure in response to determining that the computed upper bound and computed lower bound do not satisfy the stopping criteria. The branching procedure includes, but is not limited to: the rectangular bisection and the elliposoidal bisection. The branching procedure in these branch and bound algorithms is accomplished by dividing the feasible set to form the tree data structure, e.g., by using either successive ellipsoidal bisections of the ellipsoidal constraint (e.g., equation (28)) or rectangular bisections of the rectangular constraints (e.g., equations (23)-(24)).

The following describes the elliposoidal bisection in detail. Consider an ellipsoid E with a center c in the form of:

$$E = \{x \in P^n : (x-c)^T B^{-1}(x-c) \le 1\}, \quad (29)$$

where B is a symmetric, positive definite matrix. Given a nonzero vector v∈$P^n$, the sets $$H_- = \{x \in E : v^T x \le v^T c\} \text{ and } H_+ = \{x \in E : v^T x \ge v^T c\} \quad (30)$$

partition E into two sets of equal volume. Note that the hyperplane $\{x : v^T x = v^T c\}$ passes through the center c of E. The centers $c_+$ and $c_-$ and the matrix $B_\pm$ of the ellipsoids $E_\pm$ of minimum volume containing $H_\pm$ are given as follows:

$$c_\pm = c \pm \frac{d}{n+1}, \quad B_\pm = \frac{n^2}{n^2-1}\left(B - \frac{2dd^T}{n+1}\right), \quad d = \frac{Bv}{\sqrt{v^T Bv}}, \quad (31)$$

where n is the size of vector x∈$P^n$.

A ratio R of the ellipsoid of $E_\pm$ to the elliposid of E is $$R = \left(\left(\frac{n}{n+1}\right)^{n+1}\left(\frac{n}{n-1}\right)^{n-1}\right)^{\frac{1}{2}} < e^{\frac{1}{2n}} < 1. \tag{32}$$

Thus R depends on the dimension n, but not on the vector v.

The following describes an ellipoidal branch and bound algorithm that uses an ellipsidal bisection(s) in detail. For any ellipse E, define l(E) the lower bound of $f(P^{Q,0})$ over $E \cap \Omega$ obtained from the optimal result of the problem (44) described below. Assume that $u_k$ is the best upper bound value at k-th iteration. Likewise, $l_k$ is the smallest lower bound, and let $S_k$ be the set containing direct-product ellipsoids at the k-th iteration. Denote $$E^c = \left\{(e^c, f^c): \sum_{i \in N}((e_i^c)^2 + (f_i^c)^2) \leq \sum_{i \in N}(V_i^{max})^2\right\}, c = 0, \ldots, C,$$

$$E_0 = E^0 \times E^1 \times \ldots \times E^C.$$

[Ellipsoidal Branch and Bound Algorithm]
1. Set $S_0 = \{E_0\}$, evaluate $l(E_0)$ and apply a local algorithm to get an initial upper bound $u_0$, let $l_0 = l(E_0)$.
2. For k=0, 1, 2, ...
    (a) If $S_k = \emptyset$ or $u_k = l_k := \min\{l(E): E \in S_k\}$, then the optimal solution of the problem (1) has been found
    (b) Choose $E_k \in S_k$ such that $l_k = l(E_k)$. Bisect the ellipse associated with the largest diameter of $E_k$. Use the equations (29)-(31) to cover $E_k$ with two new direct-product ellipsoids denoted $E_{k1}$ and $E_{k2}$
    (c) Check if $E_{ki} \cap \Omega = \emptyset$ set $l(E_{ki}) = \infty$; otherwise evaluate $l(E_{ki})$ and compute a feasible point $y_{ki}$ of $E_{ki} \cap \Omega$, i=1,2
    (d) Let $x_{k+1}$ denote a feasible point associated with the lowest function value that has been generated up to this iteration including the current step. We have $f(x_{k+1}) \leq f(y_{ki})$, i=1,2. If $f(x_{k+1}) < u_k$, then define $u_{k+1} = f(x_{k+1})$; otherwise, $u_{k+1} = u_k$
    (e) Set $S_{k+1} = \{E \in S_k \cup \{E_{k1}\} \cup \{E_{k2}\}: l(E) < u_{k+1}, E \neq E_k\}$ Since the union of two direct-product ellipsoids $E_{k1} \cup E_{k2}$ is always greater than $E_k$, it is possible that at a given stage of the ellipsoidal branch and bound algorithm the set $E_{ki} \cap \Omega$ is empty. If so, the computing system is configured to prune $E_{ki}$ from the tree data structure as shown in step 2(c).

Suppose that in step 2(b) the vector v pointing along the axis is used. Then either the ellipsoidal branch and bound algorithm reaches an optimal solution of the optimization problem (18)-(27) in a finite number of iterations, or every accumulation point of the sequence $x_k$ is a solution of the problem (18)-(27).

The following describes rectangular bisection in detail. The branching process in the this branch and bound algorithm is based on successive rectangular bisections of bound constraints for the active and reactive powers: $P^{G,c}$ and $Q^{G,c}$ $$B^c = \left\{(P^{G,c}, Q^{G,c}): \begin{matrix} P_i^{min} \leq P_i^{G,c} \leq P_i^{max}, i \in \Gamma \\ Q_i^{min} \leq Q_i^{G,c} \leq Q_i^{max}, i \in \Gamma \end{matrix}\right\}.$$

Denote $B_0 = B^0 \times B^1 \times \ldots \times B^C$. Consider a rectangle B in general form $B = \{x \in P^n: a \leq x \leq b\}$, a point $v \in B$, and an index $j \in \{1, \ldots, n\}$. Suppose that B is partitioned into two subrectangles $B_-$ and $B_+$ determined by the hyperplane $\{x: x_j = v_j\}$:

$$B_- = \{x: a_j \leq x_j \leq v_j, a_i \leq x_i \leq b_i \text{ for all } i \neq j\},$$

$$B_+ = \{x: v_j \leq x_j \leq b_j, a_i \leq x_i \leq b_i \text{ for all } i \neq j\}.$$

A subdivision of B via (v,j) is a bisection of ratio $\alpha$ if an index j corresponds to a longest side of B and v is a point of this side such that $$\min(v_j - a_j, b_j - v_j) = \alpha(b_j - a_j).$$

Over a new generated rectangle $$B_k = \{\underline{P}_i^{min,c,k} \leq P_i^{G,c} \leq \overline{P}_i^{max,c,k}, \underline{Q}_i^{min,c,k} \leq Q_i^{G,c} \leq \overline{Q}_i^{max,c,k},$$
$$\text{for all } i \in \Gamma, c=1, \ldots, C\},$$

the Lagrange dual problem is given by $$q(\lambda, \beta, \mu, \gamma, \theta) = \min_{e^c, f^c, P^{G,c}, Q^{G,c}} L(e^c, f^c, P^{G,c}, Q^{G,c}, \lambda, \beta, \mu, \gamma, \theta) \tag{33}$$

subject to $$f_1^c = 0, c = 0, \ldots, C$$

$$\sum_{i \in N}(V_i^{min})^2 \leq \sum_{i \in N}((e_i^c)^2 + (f_i^c)^2) \leq \sum_{i \in N}(V_i^{max})^2, c = 0, \ldots, C$$

$$\underline{P}_i^{min,c,k} \leq P_i^{G,c} \leq \overline{P}_i^{max,c,k}, i \in \Gamma, c = 0, \ldots, C$$

$$\underline{Q}_i^{min,c,k} \leq Q_i^{G,c} \leq \overline{Q}_i^{max,c,k}, i \in \Gamma, c = 0, \ldots, C$$

$$|P_i^{G,c} - P_i^{G,0}| \leq \Delta P_i, i \in \Gamma, c = 1, \ldots, C$$

$$|Q_i^{G,c} - Q_i^{G,0}| \leq \Delta Q_i, i \in \Gamma, c = 1, \ldots, C$$

where L is defined in equation (37) below, the minimum can be calculated by solving the problem (40) described below and the following $$\text{minimize}_{e^c, f^c} \sum_{i \in N} \lambda_i^c \left(\sum_{j \in N}(e_i^c(g_{ij}^c e_j^c - b_{ij}^c f_j^c) + f_i^c(g_{ij}^c f_j^c + b_{ij}^c e_j^c))\right) + \tag{34}$$

$$\sum_{i \in N} \beta_i^c \left(\sum_{j \in N}(f_i^c(g_{ij}^c e_j^c - b_{ij}^c f_j^c) + e_i^c(g_{ij}^c f_j^c + b_{ij}^c e_j^c))\right) +$$

$$\sum_{(i,j) \in T} \mu_{i,j}^c ((e_i^c f_j^c - e_j^c f_i^c) b_{ij}^c + ((e_i^c)^2 + (f_i^c)^2 - e_i^c e_j^c - f_i^c f_j^c) g_{ij}^c) +$$

$$\sum_{i \in N} (\theta_i^c - \gamma_i^c)((e_i^c)^2 + (f_i^c)^2)$$

subject to $$f_1^c = 0$$

$$\sum_{i \in N}(V_i^{min})^2 \leq \sum_{i \in N}((e_i^c)^2 + (f_i^c)^2) \leq \sum_{i \in N}(V_i^{max})^2.$$

Note that the definition of this $q(\lambda, \beta, \gamma, \theta)$ is slightly different from the equation (38) described below, the computing system 400 is configured to add the lower bound constraints $$\sum_{i \in N}(V_i^{min})^2 \leq \sum_{i \in N}((e_i^c)^2 + (f_i^c)^2). \tag{35}$$

Define the set F by $$F = \{(e^c, f^c, P^{G,c}, Q^{G,c}, c=0, \ldots, C): (19), (20), (21), (22),$$
$$(25), (26), (27) \text{ and } (35)\}$$

For any direct-product box $B_k$, define $l(B_k)$ the lower bound of $f(P^Q)$ over $B_k \cap F$. Now, the rectangular branch and bound algorithm that uses a rectangular bisection(s) can be stated as follows:

[Rectangular Branch and Bound Algorithm]

1. Set $S_0=\{B_0\}$, evaluate $l(B_0)$ and apply a local algorithm to get an initial upper bound $u_0$, let $l_0=l(B_0)$
2. For k=0, 1, 2, . . .
   (a) If $S_k=\emptyset$ or $u_k=l_k:=\min\{l(B):B\in S_k\}$, then the optimal solution of the problem (1) has been found
   (b) Choose $B_k \in S_k$ such that $l_k=l(B_k)$. Bisect $B_k$ into two direct-product boxes denoted $B_{k1}$ and $B_{k2}$
   (c) Check if $B_{ki} \cap F = \emptyset$ set $l(B_{ki})=\infty$;
   otherwise evaluate $l(B_{ki})$ and compute a feasible point $y_{ki}$ of $B_{ki} \cap F$, i=1,2
   (d) Let $x_{k+1}$ denote a feasible point associated with the lowest function value that has been generated up to this iteration including the current step. Then, $f(x_{k+1}) \le f(y_{ki})$, i=1,2. If $f(x_{k+1}) < u_k$, then define $u_{k+1}=f(x_{k+1})$; otherwise, $u_{k+1}=u_k$
   (e) Set $S_{k+1}=\{B \in S_k \cup \{B_{k1}\} \cup \{B_{k2}\}:l(B)<u_{k+1}, B \ne B_k\}$.

At the root of the tree data structure, calculating the lower bounds for the two branch and bound algorithms are identical. If an objective function to be minimized is the active power losses of all branches $$f(e^0, f^0) = \sum_{i \in N} \sum_{j \in N} (g_{ij}^0)^2 ((e_i^0 - e_j^0)^2 + (f_i^0 - f_j^0)^2).$$

or any additional quadratic constraints are included, these two branch and bound algorithms still apply.

Returning to FIG. 3, at step 340, the computing system 400 is configured to re-compute the lower bound in a region in the tree data structure branched according to the applied branching procedure. At step 350, the computing system 400 is configured to update the upper bound in the region in the tree data structure and the update of the upper bound is based on the best feasible point (i.e., the point whose value is the smallest among all generated feasible points) in the tree data structure. At step 360, the computing system 400 is configured to delete nodes in the region based on the re-computed the lower bound and updated upper bound. The system is configured to repeat steps 320-360 until stopping criteria is met in which case method terminates at 370.

The following describes re-computing the lower bound for the ellipsoidal branch and bound algorithm in detail, e.g., by using the Lagrange dual problem. Assume that there exist an original feasible set SI (i.e., the original tree data structure where each node describes a possible solution of the problem (1)) and a direct-product (i.e., cartesian product) of ellipsoids $$E=E^0 \times E^1 \times \ldots \times E^C.$$

Consider that minimize $f(P^{G,0})$ subject to $(e^c, f^c, P^{G,c}, Q^{G,c}: c=0, \ldots, C) \in \Omega \cap E.$ (36)

Then, define the Lagrangian L by incorporating all the constraints in the problem (1) as follows:

$$L(e^c, f^c, P^{G,c}, Q^{G,c}, \lambda, \beta, \mu, \gamma, \theta) = f(P^{G,0}) + \sum_{c=0,\ldots,C} \left\{ \sum_{i \in N} \lambda_i^c \right. \tag{37}$$

$$\left( \sum_{j \in N} (e_i^c(g_{ij}^c e_j^c - b_{ij}^c f_j^c) + f_i^c(g_{ij}^c f_j^c + b_{ij}^c e_j^c)) + P_i^D \right) +$$

$$\sum_{i \in N} \beta_i^c \left( \sum_{j \in N} (f_i^c(g_{ij}^c e_j^c - b_{ij}^c f_j^c) - e_i^c(g_{ij}^c f_j^c + b_{ij}^c e_j^c)) + \right.$$

$$Q_i^D \right) + \sum_{(i,j) \in T} \mu_{i,j}^c ((e_i^c f_j^c - e_j^c f_i^c) b_{ij}^c +$$

$$((e_i^c)^2 + (f_i^c)^2 - e_i^c e_j^c - f_i^c f_j^c) g_{ij}^c - P_{ij}^{max}) +$$

$$\sum_{i \in N} \gamma_i^c ((V_i^{min})^2 - (e_i^c)^2 - (f_i^c)^2) +$$

$$\sum_{i \in N} \theta_i^c ((e_i^c)^2 + (f_i^c)^2 - (V_i^{max})^2) -$$

$$\left. \sum_{i \in \Gamma} \lambda_i^c P_i^{G,c} - \sum_{i \in \Gamma} \beta_i^c Q_i^{G,c} \right\},$$

where $\lambda = (\lambda^0, \lambda^1, \ldots, \lambda^C)$, $\beta = (\beta^0, \beta^1, \ldots, \beta^C)$ etc.

The Lagrange dual problem of the problem (1) is given by $$q(\lambda, \beta, \mu, \gamma, \theta) = \min_{e^c, f^c, P^{G,c}, Q^{G,c}} L(e^c, f^c, P^{G,c}, Q^{G,c}, \lambda, \beta, \mu, \gamma, \theta) \tag{38}$$

subject to $f_1^c = 0, c = 0, \ldots, C$ $(e^c, f^c) \in E^c, c = 0, \ldots, C$ $P_i^{min} \le P_i^{G,c} \le P_i^{max}, i \in \Gamma, c = 0, \ldots, C$ $Q_i^{min} \le Q_i^{G,c} \le Q_i^{max}, i \in \Gamma, c = 0, \ldots, C$ $|P_i^{G,c} - P_i^{G,0}| \le \Delta P_i, i \in \Gamma, c = 1, \ldots, C$ $|Q_i^{G,c} - Q_i^{G,0}| \le \Delta Q_i, i \in \Gamma, c = 1, \ldots, C.$ For any value of the Lagrange multipliers $\{(\lambda,\beta,\gamma,\theta):\gamma \ge 0, \theta \ge 0\}$, the value of the dual function provides a lower bound on an optimal result of the problem (1). To obtain the best lower bound for all possible Lagrange multipliers, the computing system is configured to solve the dual problem as follows:

maximize$_{\lambda,\beta,\mu,\gamma,\theta} q(\lambda,\beta,\mu,\gamma,\theta)$ subject to $\mu \ge 0, \gamma \ge 0, \theta \ge 0.$ (39)

The computing system 400 is configured to decompose the problem (38) into C+2 sub-problems as follows:

$$\text{minimize}_{P^{G,c}, Q^{G,c}} f(P^{G,0}) - \sum_{c=0,\ldots,C} \left\{ \sum_{i \in \Gamma} \lambda_i^c P_i^{G,c} - \sum_{i \in \Gamma} \beta_i^c Q_i^{G,c} \right\} \tag{40}$$

subject to $P_i^{min} \le P_i^{G,c} \le P_i^{max}, i \in \Gamma, c = 0, \ldots, C$ $Q_i^{min} \le Q_i^{G,c} \le Q_i^{max}, i \in \Gamma, c = 0, \ldots, C$ $|P_i^{G,c} - P_i^{G,0}| \le \Delta P_i, i \in \Gamma, c = 1, \ldots, C$ $|Q_i^{G,c} - Q_i^{G,0}| \le \Delta Q_i, i \in \Gamma, c = 1, \ldots, C.$ -continued $$\text{minimize}_{e^c, f^c} \sum_{i \in N} \lambda_i^c \Big( \sum_{j \in N} (e_i^c(g_{ij}^c e_j^c - b_{ij}^c f_j^c) + f_i^c(g_{ij}^c f_j^c + b_{ij}^c e_j^c)) \Big) + \quad (41)$$

$$\sum_{i \in N} \beta_i^c \Big( \sum_{j \in N} (f_i^c(g_{ij}^c e_j^c - b_{ij}^c f_j^c) - e_i^c(g_{ij}^c f_j^c + b_{ij}^c e_j^c)) \Big) +$$

$$\sum_{(i,j) \in T} \mu_{i,j}^c ((e_i^c f_j^c - e_j^c f_i^c) b_{ij}^c + ((e_i^c)^2 + (f_i^c)^2 - e_i^c e_j^c - f_i^c f_j^c) g_{ij}^c) +$$

$$\sum_{i \in N} (\theta_i^c - \gamma_i^c)((e_i^c)^2 + (f_i^c)^2)$$

subject to
$f_1^c = 0$
$(e^c, f^c) \in E^c$.

Figure 4:
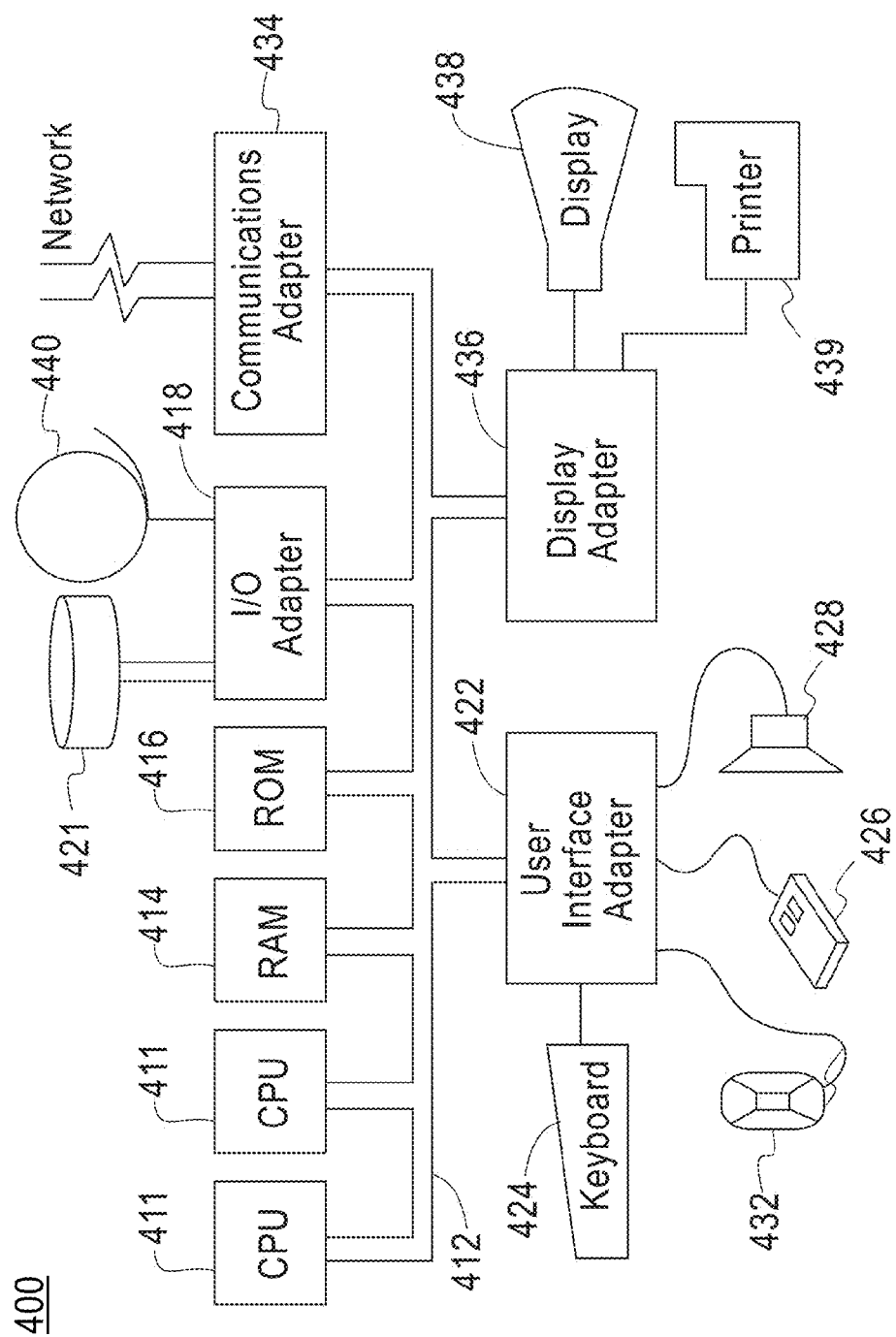
FIG. 4 illustrates an exemplary hardware configuration for implementing the flow charts depicted in FIGS. 1-3 in one embodiment.

FIG. 4 illustrates an exemplary hardware configuration of the computing system 400 that runs the method steps described in FIGS. 1-3. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. In a further embodiment, the computing system analyzes properties of the enterprise and market social networks to build features for predictive models of a propensity for a customer to buy a product, or to close a deal in a particular period of time.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for determining an amount of an electric power to generate in an electric power system and determining a total cost for generating the amount of electric power while satisfying at least one contingency constraint and one or more customer request, the method comprising:
creating, by using a computing system including at least one memory device and at least one processor connected to the memory device, an optimization problem for calculating the amount of the electric power to be generated and a total cost for generating the calculated amount of the electric power while meeting the at least one contingency constraint and the one or more customer request, the at least one contingency constraint including one or more of: a transmission line failure, a power generator failure, a transformer failure, a structure of a power distribution network, and a topology of the power distribution network;
running, by using the computing system, the optimization problem in real-time; and
outputting, from the optimization problem run by the computing system, an output specifying the calculated amount of the electric power and the total cost to generate the calculated amount of the electric power.

2. The method according to claim 1, wherein the step of running the optimization problem includes:
solving, by the computing system, the optimization problem without considering the at least one contingency constraint;
checking, by the computing system, whether a result of the computed optimization problem satisfies the at least one contingency constraint;
outputting, by the computing system, the result in response to determining that the result satisfies the at least one contingency constraint;
pruning, by computing system, in response to determining that the result does not satisfy the at least one contingency constraint, one or more results of the optimization problem that do not satisfy the at least one contingency constraint; and
solving, by the computing system, the optimization problem with the pruned results.

3. The method according to claim 1, wherein the step of running the optimization problem includes:
generating, by the computing system, a template to solve the optimization problem;
reformulating, by the computing system, the optimization problem based on the generated template;
forming, by the computing system, an augmented Lagrangian for the reformulated optimization problem;
initializing, by the computing system, Lagrangian multipliers and decision variables according to the at least one contingency constraint; and
solving, by the computing system, the reformulated optimization problem with the initialized Lagrangian multipliers and decision variables, based on an alternating direction method of multipliers.

4. The method according to claim 3, further comprising:
breaking the reformulated optimization problem into one or more sub-problems;
solving the one or more sub-problems with the initialized Lagrangian multipliers and decision variables, based on the formed augmented Lagrangian;
evaluating whether a solution of the one or more sub-problems meets a stopping criterion;
outputting the solution in response to determining that the solution meets the stopping criterion; and
updating the Lagrangian multipliers based on the solution, in response to determining that the solution does not meet the stopping criterion.

5. The method according to claim 1, wherein the step of running the optimization problem includes:
building a tree data structure, each node of the tree data structure describing a possible solution of the optimization problem;
computing, at each node of the built tree data structure, an upper bound and lower bound of an objective function for determining the cost for generating the electric power, the lower bound being calculated from Lagrange duality, the upper bound being calculated from an interior-point method;
evaluating, at each node of the built tree data structure, whether the computed upper bound and computed lower bound satisfy a stopping criterion;
outputting the computed upper bound and the computed lower bound in response to determining that the computed upper bound and computed lower bound satisfy the stopping criterion;
applying at least one branching procedure on the tree data structure in response to determining that the computed upper bound and computed lower bound do not satisfy the stopping criteria;
re-computing the lower bound in a region in the tree data structure branched according to the applied branching procedure;
updating the upper bound in the region in the tree data structure;
deleting nodes in the region based on the re-computed the lower bound and updated upper bound or an intersection of the branched region and an original feasible set, the original feasible set referring to possible solutions of the optimization problem satisfying the at least one contingency constraint; and
repeating the step of evaluating, the step of the outputting, the step of applying, the step of re-computing, the step of updating, and the step of deleting.

6. The method according to claim 5, wherein the stopping criterion includes one or more of:
a gap between a smallest computed lower bound and the computed upper bound is lower than a pre-determined threshold, or the tree data structure is empty.

7. The method according to claim 5, wherein the at least one branching procedure includes one or more of: ellipsoidal bisection and rectangular bisection.

8. The method according to claim 1, wherein the one or more customer request includes: a demand or load for a certain amount of the electric power.

9. A system for determining an amount of an electric power to generate in an electric power system and determining a total cost for generating the amount of electric power while satisfying at least one contingency constraint and one or more customer request, the system comprising:
at least one memory device;
at least one processor connected to the memory device, wherein the processor is configured to:
create an optimization problem for calculating an amount of the electric power to be generated and a total cost for generating the calculated amount of the electric power while meeting the at least one contingency constraint and the one or more customer request, the at least one contingency constraint including one or more of: a transmission line failure, a power generator failure, a transformer failure, a structure of a power distribution network, and a topology of the power distribution network;
run the optimization problem in real-time; and
output, from the optimization problem, an output specifying the calculated amount of the electric power and the total cost to generate the calculated amount of the electric power.

10. The system according to claim 9, wherein to run the optimization problem, the processor is further configured to:
solve the optimization problem without considering the at least one contingency constraint;
check whether a result of the computed optimization problem satisfies the at least one contingency constraint;
output the result in response to determining that the result satisfies the at least one contingency constraint;
prune, in response to determining that the result does not satisfy the at least one contingency constraint, one or more results of the optimization problem that do not satisfy the at least one contingency constraint; and
solve the optimization problem with the pruned results.

11. The system according to claim 9, wherein to run the optimization problem, the processor is further configured to:
generate a template to solve the optimization problem;
reformulate the optimization problem based on the generated template;
form an augmented Lagrangian for the reformulated optimization problem;
initialize Lagrangian multipliers and decision variables according to the at least one contingency constraint; and
solve the reformulated optimization problem with the initialized Lagrangian multipliers and decision variables, based on an alternating direction method of multipliers.

12. The system according to claim 11, wherein the processor is further configured to:
break the reformulated optimization problem into one or more sub-problems;
solve the one or more sub-problems with the initialized Lagrangian multipliers and decision variables, based on the formed augmented Lagrangian;
evaluate whether a solution of the one or more sub-problems meets a stopping criterion;
outputting the solution in response to determining that the solution meets the stopping criterion; and
update the Lagrangian multipliers based on the solution, in response to determining that the solution does not meet the stopping criterion.

13. The system according to claim 9, wherein to run the optimization problem, the processor is further configured to:
build a tree data structure, each node of the tree data structure describing a possible solution of the optimization problem;
compute, at each node of the built tree data structure, an upper bound and lower bound of an objective function, the objective function determining the cost for generating the electric power, the lower bound being calculated from Lagrange duality, the upper bound being calculated from an interior-point method;
evaluate, at each node of the built tree data structure, whether the computed upper bound and computed lower bound satisfy a stopping criterion;
output the computed upper bound and the computed lower bound in response to determining that the computed upper bound and computed lower bound satisfy the stopping criterion;
apply at least one branching procedure on the tree data structure in response to determining that the computed upper bound and computed lower bound do not satisfy the stopping criteria;
re-compute the lower bound in a region in the tree data structure branched according to the applied branching procedure;
update the upper bound in the region in the tree data structure;
delete nodes in the region based on the re-computed the lower bound and updated upper bound or an intersection of the branched region and an original feasible set, the original feasible set referring to possible solutions of the optimization problem satisfying the at least one contingency constraint; and
repeat the evaluate, the output, the apply, the re-compute, the update, and the delete.

14. The system according to claim 13, wherein the stopping criterion includes one or more of:
a gap between a smallest computed lower bound and the computed upper bound is lower than a pre-determined threshold, or the tree data structure is empty.

15. The system according to claim 13, wherein the at least one branching procedure includes one or more of: ellipsoidal bisection and rectangular bisection.

16. The system according to claim 9, wherein the one or more customer request includes: a demand or load for a certain amount of the electric power.

17. A computer program product for determining an electricity dispatch plan of an electric power system with a total cost for determining an amount of an electric power to generate in an electric power system and determining a total cost for generating the amount of electric power while satisfying at least one contingency constraint and one or more customer request, the computer program product comprising a storage medium, said medium is not a propagating signal, readable by a processing circuit and storing instructions run by the processing circuit for performing a method, the method comprising: creating an optimization problem for calculating an amount of the electric power to be generated and a total cost for generating the calculated amount of the electric power while meeting the at least one contingency constraint and the one or more customer request, the at least one contingency constraint including one or more of: a transmission line failure, a power generator failure, a transformer failure, a structure of a power distribution network, and a topology of the power distribution network; running the optimization problem in real-time; and outputting an output specifying the calculated amount of the electric power and the total cost to generate the calculated amount of the electric power.

18. The computer program product according to claim 17, wherein the step of running the optimization problem includes:
   solving the optimization problem without considering the at least one contingency constraint;
   check whether a result of the computed optimization problem satisfies the at least one contingency constraint;
   output the result in response to determining that the result satisfies the at least one contingency constraint;
   prune, in response to determining that the result does not satisfy the at least one contingency constraint, one or more results of the optimization problem that do not satisfy the at least one contingency constraint; and
   solve the optimization problem with the pruned results.

19. The computer program product according to claim 17, wherein the step of running the optimization problem includes:
   generating a template to solve the optimization problem;
   reformulating the optimization problem based on the generated template;
   forming an augmented Lagrangian for the reformulated optimization problem;
   initializing Lagrangian multipliers and decision variables according to the at least one contingency constraint; and
   solving the reformulated optimization problem with the initialized Lagrangian multipliers and decision variables, based on an alternating direction method of multipliers.

20. The computer program product according to claim 19, wherein the method further comprises:
   breaking the reformulated optimization problem into one or more sub-problems;
   solving the one or more sub-problems with the initialized Lagrangian multipliers and decision variables, based on the formed augmented Lagrangian;
   evaluating whether a solution of the one or more sub-problems meets a stopping criterion;
   outputting the solution in response to determining that the solution meets the stopping criterion; and
   updating the Lagrangian multipliers based on the solution, in response to determining that the solution does not meet the stopping criterion.

21. The computer program product according to claim 17, wherein the step of running the optimization problem includes:

building a tree data structure, each node of the tree data structure describing a possible solution of the optimization problem;
   computing, at each node of the built tree data structure, an upper bound and lower bound of an objective function, the objective function determining the cost for generating the electric power, the lower bound being calculated from Lagrange duality, the upper bound being calculated from an interior-point method;
   evaluating, at each node of the built tree data structure, whether the computed upper bound and computed lower bound satisfy a stopping criterion;
   outputting the computed upper bound and the computed lower bound in response to determining that the computed upper bound and computed lower bound satisfy the stopping criterion;
   applying at least one branching procedure on the tree data structure in response to determining that the computed upper bound and computed lower bound do not satisfy the stopping criteria;
   re-computing the lower bound in a region in the tree data structure branched according to the applied branching procedure;
   updating the upper bound in the region in the tree data structure;
   deleting nodes in the region based on the re-computed the lower bound and updated upper bound or an intersection of the branched region and an original feasible set, the original feasible set referring to possible solutions of the optimization problem satisfying the at least one contingency constraint; and
   repeating the step of evaluating, the step of the outputting, the step of applying, the step of re-computing, the step of updating, and the step of deleting.

22. The computer program product according to claim 21, wherein the stopping criterion includes one or more of:
   a gap between a smallest computed lower bound and the computed upper bound is lower than a pre-determined threshold, or the tree data structure is empty.

23. The computer program product according to claim 21, wherein the at least one branching procedure includes one or more of: ellipsoidal bisection and rectangular bisection.

24. The computer program product according to claim 17, wherein the one or more customer request includes: a demand or load for a certain amount of the electric power.

* * * * *